Figure 1:
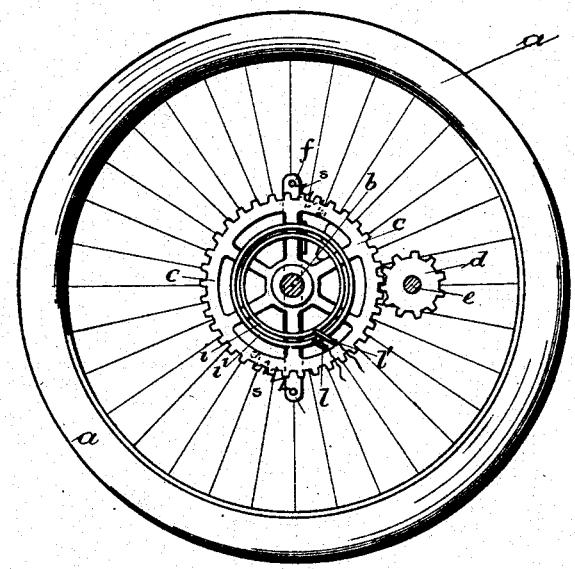

No. 676,965. Patented June 25, 1901.
J. SACHS.
MEANS FOR RECHARGING STORAGE BATTERIES OF ELECTRIC VEHICLES.
(Application filed Oct. 5, 1900.)
(No Model.) 2 Sheets—Sheet 1.

Witnesses
Inventor
Joseph Sachs.
Attys

No. 676,965. Patented June 25, 1901.
J. SACHS.
MEANS FOR RECHARGING STORAGE BATTERIES OF ELECTRIC VEHICLES.
(Application filed Oct. 5, 1900.)
(No Model.) 2 Sheets—Sheet 2.

UNITED STATES PATENT OFFICE.

JOSEPH SACHS, OF HARTFORD, CONNECTICUT.

MEANS FOR RECHARGING STORAGE BATTERIES OF ELECTRIC VEHICLES.

SPECIFICATION forming part of Letters Patent No. 676,965, dated June 25, 1901.

Application filed October 5, 1900. Serial No. 32,068. (No model.)

*To all whom it may concern:*

Be it known that I, JOSEPH SACHS, a citizen of the United States, residing at Hartford, in the county of Hartford and State of Connecticut, have invented a new and useful Improvement in Means for Recharging the Storage Batteries of Electric-Motor Vehicles in Travel, of which the following is a specification.

Heretofore batteries have been recharged by the operation of the motor when the vehicle was running free; but in such cases it was obligatory that the vehicle run free faster than when driven; and the object of my invention is to recharge the battery when the vehicle is on the road and running free either on a downgrade, regardless of the speed attained by the vehicle, or when, after the motor has been shut off, the vehicle is being stopped.

It is well understood that in a motor the effective electromotive force is practically equal to the impressed electromotive force less the counter electromotive force—that is, in order that an electric dynamo-machine may run as a motor the electromotive force at its brushes must be greater than the counter electromotive force generated by the motor. Now if mechanical means are provided whereby the armature of said motor is driven by the free-running vehicle it will be necessary to increase the field magnetization of the motor now operating as a generator in order that it generate the required voltage to charge the batteries without revolving at a higher speed than when working as a motor. At the same time it is desired to obtain this electromotive force at any speed at which the vehicle may move after the motor has been shut off, and for this purpose I employ a suitable automatic regulating device in which the field strength of the dynamo-electric machine is varied inversely as the speed, so that when operating at a high speed the voltage delivered to the battery will be the same as when operating at a low speed.

In carrying out my invention I provide the motor with a supplemental field and employ means whereby said supplemental field is thrown into the circuit when the vehicle is coasting. When the motor is driving the vehicle, the supplemental motor-field is cut out, and when the vehicle is driving the motor-armature, as on downgrades, the supplemental field is cut in. Now whether the speed downgrade is less, equal to, or greater than the speeds on the level or up grades it will be understood how the electromotive force generated when the vehicle is coasting will be greater than the electromotive force impressed when the machine is run as a motor, and hence how when the vehicle is coasting the storage battery will be recharged.

Figures 2, 3:
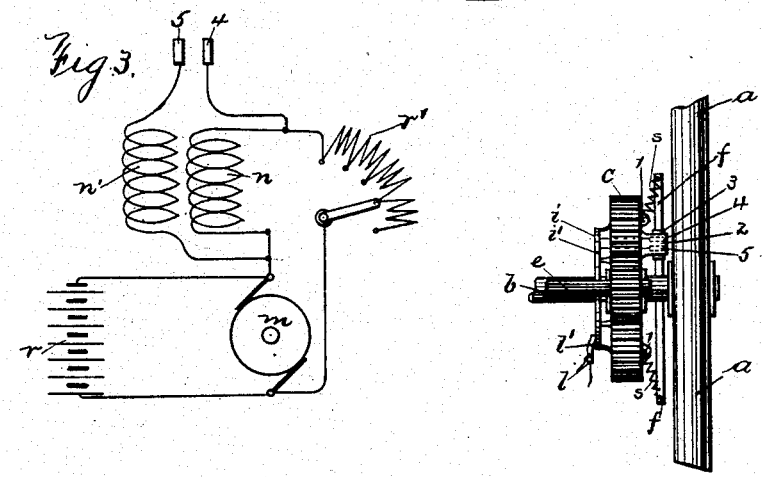
Figure 4:
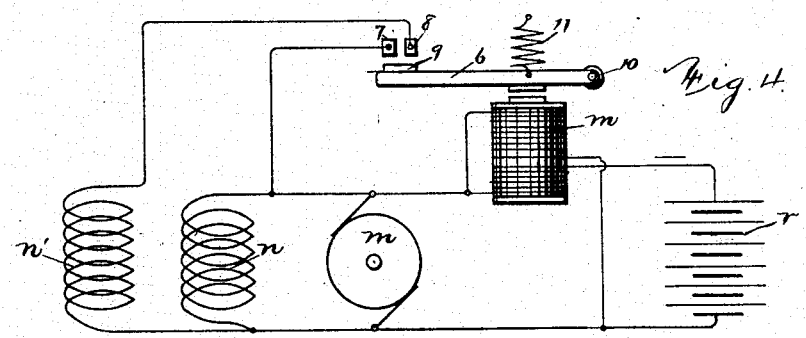
Figure 5:
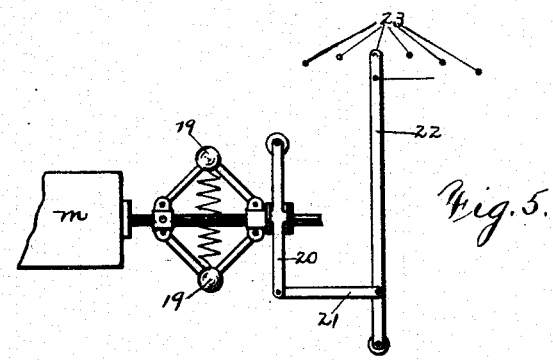

In the drawings, Figure 1 is a side elevation of a device embodying my present invention as applied to a motor-vehicle. Fig. 2 is an end view of the same. Fig. 3 is a diagrammatic representation of the electrical connections. Fig. 4 represents an equivalent form of electrical connections wherein an electromagnet is employed to open and close the supplemental-field circuit. Fig. 5 represents a means of automatic field regulation as described in my application, Serial No. 24,870, filed July 26, 1900; and in Fig. 6 I have shown a mechanical means of opening and closing the supplemental-field circuit.

$a$ represents the vehicle-wheel; $b$, the driving-axle; $c$, a gear-wheel loose upon the axle $b$. $d$ is a pinion upon the motor-shaft $e$, meshing with the gear $c$. The wheel $a$ is secured to the axle $b$—that is, the one cannot turn without the other. Between the vehicle-wheel $a$ and the gear $c$ a transverse bar $f$ is fastened to the axle $b$. The lugs 1 are integral with the gear-wheel $c$, and springs $s$ connect the lugs 1 with the ends of the transverse bar $f$. The gear $c$ also carries a lug 2, upon and insulated from which are two metal contact-pieces 4 and 5. Upon the transverse bar $f$ is a metal contact 3, so placed that as the gear $c$ comes around the contact 3 bears upon the contacts 4 and 5 on the lug 2. The contacts 4 and 5 are electrically connected to rings $i$ and $i'$, respectively, which rings are also carried by the gear $c$. Brushes $l\,l'$, bearing upon the rings $i$ and $i'$, are the terminals of the supplemental motor-field $n'$, Fig. 3.

In Fig. 3, $r$ represents the storage battery; $m$, the motor; $n$, the field; 4 and 5, the contacts through which the supplemental-field circuit is closed; $r'$, a rheostat or other means for regulating the field strength, any means being employed—as, for example, those shown in my application, Serial No. 24,870, filed July 26, 1900.

When the motor is propelling the vehicle, the driving is done through the gear $c$ and springs $s$ and bar $f$ to the axle $b$ and wheel $a$. Under these conditions the contact between 3 and 4 5 is broken, and consequently the supplemental motor-field is open, the field $n$ supplying the necessary excitation and the battery $r$ supplying the power to drive the motor. Now when the armature of the dynamo-electric machine is being driven by the vehicle—that is, when the vehicle is coasting—the bar $f$ brings the contacts 3 and 4 5 together, closing the supplemental-field circuit and driving the armature from the wheel $a$ through the axle $b$, bar $f$ to lug 2 on the gear $c$, and thence to the armature. Assuming now that the speed in coasting is less, equal to, or greater than that when the motor is driving the vehicle, the increased field strength will cause the machine to run as a generator at a higher voltage than the impressed electromotive force to run it as a motor, and hence the machine may be used under these circumstances to recharge the storage battery.

An equivalent form of my invention is the employment of an electromagnet to open and close the supplemental-field circuit. The electrical connections in this case are shown in Fig. 4.

The electromagnet $m'$ has a double winding—one in a series with the motor and the other shunted across the motor-terminals. It is evident from the connections that when the battery $r$ is driving the vehicle the magnet-windings aid one another in holding the armature against the magnet-pole. The armature is carried by an arm 6, pivoted at 10. The opposite end of the arm 6 carries the contact 9, which latter is used to close the supplemental-field circuit through the contacts 7 and 8. When the battery-current is shut off, the armature is released and the supplemental field is closed by the spring 11 moving the armature and arm 6 away from the magnet-pole and bringing the contact 9 against contacts 7 and 8. When the vehicle is coasting and the dynamo-electric machine is running as a generator, the connections are such that the magnet-windings oppose and neutralize one another, whereby the armature of the magnet is not affected and the supplemental-field circuit remains closed while the vehicle is running free.

Figure 6:
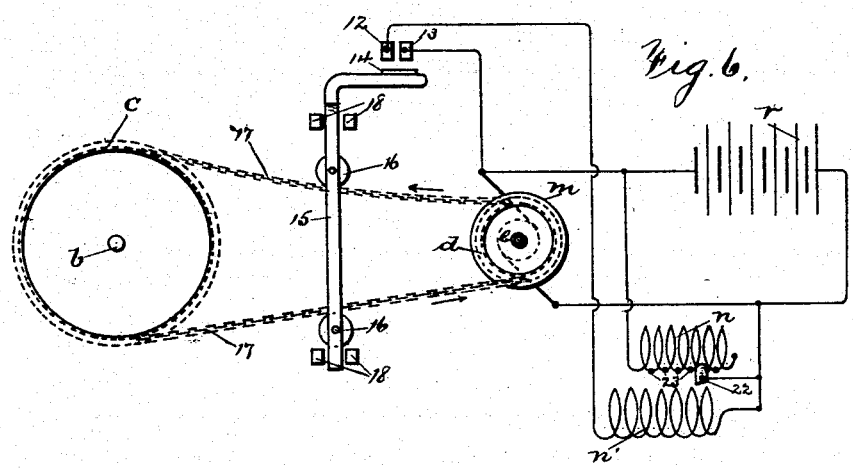

In Fig. 6 I have shown an equivalent means of carrying out my invention mechanically. The driving-gear $c$ on the shaft of the vehicle-wheels and the pinion $d$ on the motor-shaft are connected by a chain 17. A frame 15, having rollers 16, is fitted over the chain 17 and held in place by the fixed guide-blocks 18. The upper part of the frame 15 carries a contact 14. Assuming that the chain travels in the direction of the arrows when the vehicle is going forward, it is evident that when the motor is driving the vehicle the lower side of the chain will be taut and the frame 15 will sag with the upper side of the chain. When the vehicle is driving the motor-armature, however, the upper side of the chain is taut and the frame 15 is raised, thereby bringing the contact 14 into connection with contacts 12 and 13, so closing the supplemental-field circuit, which condition holds while the vehicle is coasting.

Fig. 6 represents a governor, which is used as a means for automatically controlling the fields of the dynamo-electric machine and is shown in conjunction with the devices illustrated in Fig. 6, although it is also employed with both of the other means shown for opening and closing the supplemental field. $m$ represents the motor; 19, a governor on the motor-shaft, which acts through levers 20 and 22 and link 21 to cut in or out various field-coils, as described in my application, Serial No. 24,870, filed July 26, 1900. As the speed of the motor increases the field-coils are cut out and the field strength decreased. As the speed of the motor decreases the field-coils are cut in again and the field strength increased. The torque varies directly as the current and the magnetic flux. Now, therefore, when the machine is running as a motor any demand for an increased torque will be supplied automatically at a lower speed by an increase of the field strength, the current supplied by the battery remaining constant.

In a generator the electromotive force varies directly as the speed and the magnetic flux. When the machine is running as a generator, the governor will still cause the speed and the flux to vary inversely. Now, therefore, any change in speed will only cause an inverse change in the flux, and consequently the electromotive force generated and at which the batteries are recharged, is practically constant, regardless of the speed attained by the motor.

I claim as my invention—

1. In an electric-motor vehicle the combination with a storage battery, of a motor electrically actuated thereby, and devices for increasing the field strength of the motor when the motor is driven as a dynamo by the free running of the vehicle, substantially as specified.

2. In an electric-motor vehicle the combination with a storage battery and a motor electrically actuated thereby, of devices actuated by the motor and interposed between the same and the running-gear for driving the machine and devices actuated by the free running of the vehicle and electrical devices brought into operation thereby for increasing the field strength and recharging the battery, substantially as specified.

3. In an electrically-driven vehicle, the combination with an electric motor and a storage battery furnishing current to the same for driving the vehicle, of means controlled by the speed of the motor for automatically varying the field strength and means for increasing the field strength and regulating the same when the motor is driven as a dynamo by the free running of the vehicle to recharge the batteries, substantially as specified.

4. In an electrically-driven vehicle, the combination with a battery, a driving-motor and interposed mechanical devices, of means for increasing the field of the motor when driven, as a dynamo by the free running of the vehicle and additional means for varying the field strength inversely as the speed, substantially as specified.

5. In an electrically-driven vehicle the combination with a storage battery of a driving-motor, a mechanical connection between the motor and the wheels, means connected to and actuated by the mechanical connection and adapted to cause an increase in the field magnetization of the motor when the latter is driven as a dynamo by the free-running vehicle.

6. In an electric vehicle a driving-motor having two field-windings, means for controlling one field-winding by the speed and means for controlling the cutting in and out of the other field-winding by the direction of pull in the transmission of energy, substantially as specified.

Signed by me this 25th day of September, 1900.

JOSEPH SACHS.

Witnesses:
 GEO. T. PINCKNEY,
 BERTHA M. ALLEN.